United States Patent [19]

Aso et al.

[11] Patent Number: 4,857,688
[45] Date of Patent: Aug. 15, 1989

[54] MACHINING FLUID SUPPLY CONTROLLING SYSTEM FOR A WIRE CUT ELECTRICAL DISCHARGE MACHINE

[75] Inventors: Toshiyuki Aso, Hino; Yuuki Kita, Hachioji; Sadahiro Watanabe, Kunitachi, all of Japan

[73] Assignee: Fanuc Ltd., Yamanashi, Japan

[21] Appl. No.: 196,192

[22] PCT Filed: Sep. 2, 1987

[86] PCT No.: PCT/JP87/00652

§ 371 Date: Apr. 28, 1988

§ 102(e) Date: Apr. 28, 1988

[87] PCT Pub. No.: WO88/01548

PCT Pub. Date: Mar. 10, 1988

[30] Foreign Application Priority Data

Sep. 6, 1986 [JP] Japan ............................ 61-208848

[51] Int. Cl.⁴ ............................................... B23H 1/10
[52] U.S. Cl. ................................... 219/69.14; 137/563
[58] Field of Search ............... 219/69 D; 204/224 M; 137/563; 210/681, 746

[56] References Cited

U.S. PATENT DOCUMENTS 4,367,129  1/1983  Inoue ............................. 219/69 D
4,628,170  12/1986  Furukawa ...................... 219/69 D

FOREIGN PATENT DOCUMENTS 156132   9/1982  Japan ............................ 219/69 D
58-10429  1/1983  Japan ............................ 219/69 D
58-77413  5/1983  Japan ............................ 219/69 D
61-25725  2/1986  Japan ............................ 219/69 D
61-78121  8/1986  Japan .
178120   8/1986  Japan ............................ 219/69 D Primary Examiner—A. D. Pellinen
Assistant Examiner—Geoffrey S. Evans
Attorney, Agent, or Firm—Armstrong, Nikaido, Marmelstein, Kubovcik & Murray

[57] ABSTRACT

A wire cut electrical discharge machine (10) has two machining fluid supply systems respectively for supplying machining fluid is having different qualities to the machining section (14) thereof, namely, a rough-machining fluid supply system (20) and a finish-machining fluid supply system (60). The rough-machining fluid supply system (20) has a first machining fluid quality regulating circuit comprising a first machining fluid tank (26) having a filtering device (3) for filtering powdery chips, a specific resistance detector (34), a cooler or heater (42, 44), an ion exchange device (52) and pumps (40, 58), and the finish-machining fluid supply system (60) has a second machining fluid quality regulating circuit comprising a second machining fluid tank (66), a specific resistance detector (74), an ion exchange device (92), a cooler or heater (42, 44) and pumps (40, 98). A machining fluid of a quality appropriate for the purpose of wire cut electrical discharge machining, namely, rough machining or finish machining, is supplied to the machining section.

4 Claims, 1 Drawing Sheet 4,857,688

MACHINING FLUID SUPPLY CONTROLLING SYSTEM FOR A WIRE CUT ELECTRICAL DISCHARGE MACHINE

DESCRIPTION

1. TECHNICAL FIELD

The present invention relates to a machining fluid supply controlling system for a wire cut electrical discharge machine and, more particularly, to a machining fluid supply controlling system for a wire cut electrical discharge machine, and capable of improving a finishing accuracy of the wire cut electrical discharge machining.

2. BACKGROUND ART

It is well known that the quality of water having a high purity used as a machining fluid is closely related to the machining accuracy of the wire cut electrical discharge machining. The quality of the machining fluid, i.e., water having a high purity, is adjusted according to the machining purpose. That is, the specific resistance of the machining fluid is maintained at a comparatively low value for rough machining, in which a high discharge current is supplied to the wire cut electrical discharge machine in order to avoid adhesion of powdery chips to the work, while the specific resistance of the machining fluid must be maintained at a high value for a finishing wire cut electrical discharge machining in which a low discharge current is supplied to the wire cut electrical discharge machine, because the electrical discharge machining action is reduced due to current leakage when the specific resistance of the machining fluid is small.

However, no single conventional wire cut electrical discharge machine has been able to integrally and efficiently carry out rough machining through finish machining by simply changing the quality, particularly, the specific resistance, of the machining fluid for rough machining and for finish machining. Therefore, it has been necessary to use separate wire cut electrical discharge machines for rough machining and for finish machining respectively.

Accordingly, it is an object of the present invention to provide a machining fluid supply controlling system for a wire cut electrical discharge machine, capable of readily changing the specific resistance of the machining fluid between a level appropriate for rough machining and a level appropriate for finish machining when controlling the quality of the machining fluid, to enable a single wire cut electrical discharge machine to integrally carry out the rough machining through finish machining.

DISCLOSURE OF THE INVENTION

The present invention provides a machining fluid supply controlling system for a wire cut electrical discharge machine having a rough-machining fluid supply system for rough machining and a finish-machining fluid supply system for finish machining, which are connected to the machining section of the wire cut electrical discharge machine, and capable of supplying machining fluids respectively having different qualities respectively for rough machining and for finish machining. The system comprises a first machining fluid tank having a filtering device and provided in the rough-machining fluid supply system. A second machining fluid tank has a filtering device and is provided in the finish-machining fluid supply system. A first machining fluid supply passage a pressurized machining fluid from the first machining fluid tank to the machining section. A second machining fluid supply passage supplies a pressurized machining fluid from the second machining fluid tank to the machining section. First and second return passages return the machining fluid from the machining section respectively to the first and second machining fluid tanks. A first machining fluid quality regulating circuit regulates the quality of the machining fluid to be supplied under pressure from the first machining fluid tank to the machining section. A second machining fluid quality regulating circuit regulates the quality of the machining fluid to be supplied under pressure from the second machining fluid tank to the machining section.

Preferably, the first machining fluid quality regulating circuit and the second machining fluid quality regulating circuit are provided respectively with specific resistance detectors, each for detecting the specific resistance of the associated machining fluid, respectively with flow regulating valves each capable of varying in opening degree according to the specific resistance of the machining fluid detected by the corresponding specific resistance detector, and respectively with ion exchange devices for increasing the specific resistance of the machining fluid. The second machining fluid tank has a capacity smaller than that of the first machining fluid tank. The machining fluids are supplied respectively through the first and second machining fluid supply passages by a pump under substantially the same pressure.

BRIEF DESCRIPTION OF THE DRAWINGS

The above and other objects, features and advantages of the present invention will become more apparent from the following description taken in conjunction with the accompanying drawing, in which.

BEST MODE FOR CARRYING OUT THE INVENTION

Figure 1:
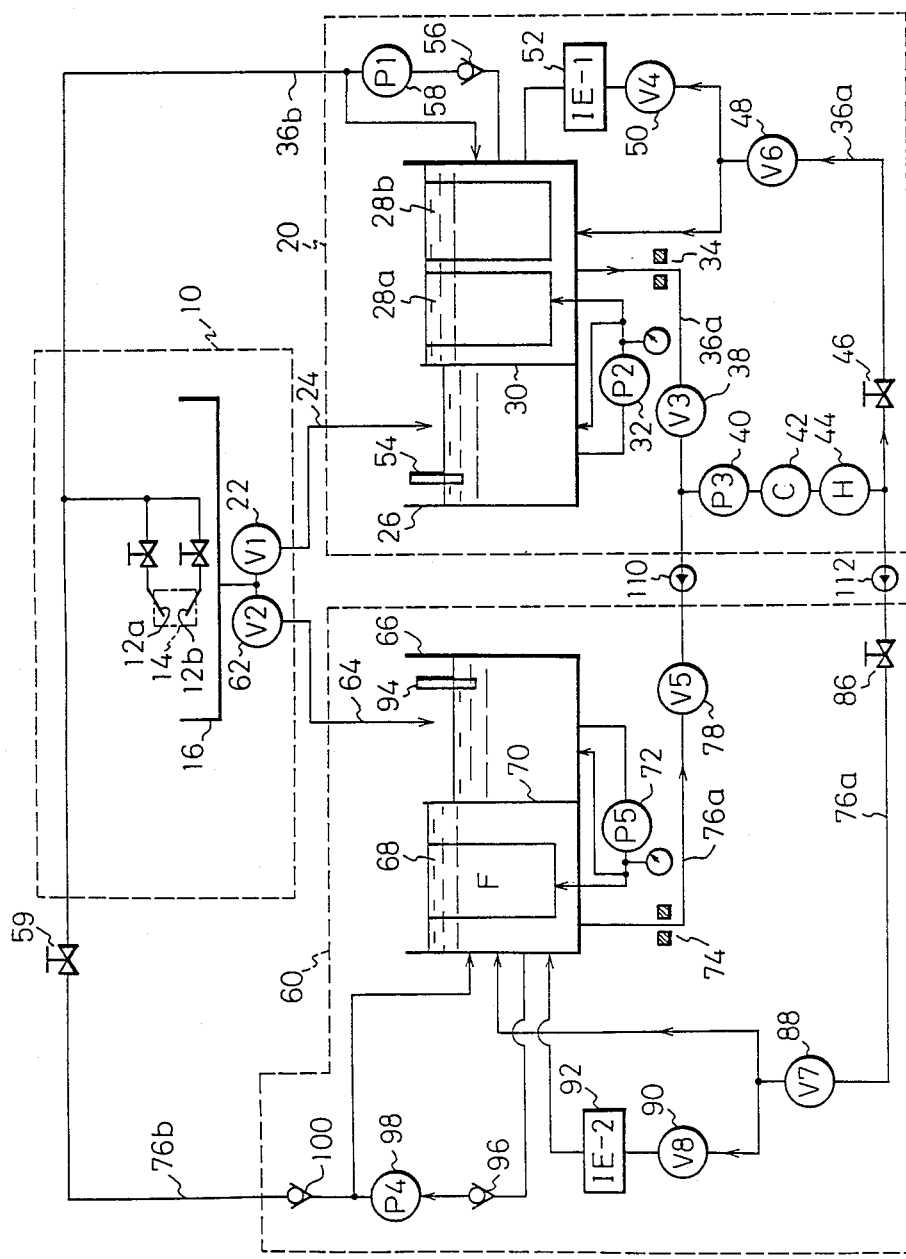
FIG. 1 is schematic block diagram of a machining fluid supply controlling system for a wire cut electrical discharge machine, in a preferred embodiment according to the present invention.

Referring to FIG. 1, enclosed by dotted lines and generally indicated at 10 is an electrical discharge machine provided with a machining section 14 having a machining fluid jetting unit including an upper nozzle 12a and a lower nozzle 12b. A machining fluid spouted into the machining section 14 is collected in a receptacle 16 for recovery. The machining fluid collected in the receptacle 16 is returned to a first machining fluid tank or to a second machining fluid tank included in the machining fluid supply controlling system, which will be described afterward. The machining fluid thus recovered is subjected to a regenerating process for removing powdery chips and adjusting or improving the quality, and then the regenerated machining fluid is supplied again to the machining section 14.

The machining fluid supply controlling system has a rough-machining fluid supply system 20 and a finish-machining fluid supply system 60. The used machining fluid can be returned from the receptacle 16 of the electrical discharge machine 10 through a first machining fluid return passage 24 provided with a shutoff valve 22 to the first machining fluid tank 26, or from the receptacle 16 through a second machining fluid return passage 64 provided with a shutoff valve 62 to the second machining fluid tank 66. The first machining fluid tank 26 of the rough-machining fluid supply system 20 is provided internally with a filtering device 30 having filter elements 28a and 28b. The used machining fluid returned from the receptacle 16 is circulated through the filtering device 30 by a pump ($P_2$) 32 to remove powdery chips from the machining fluid. The discharge port of the pump 32 is connected also to the first machining fluid tank 26 to avoid overloading the pump 32 due to the circulation of the machining fluid through the filtering device 30 at an excessive flow rate. After removing powdery chips from the machining fluid by the filtering device 30, the machining fluid is pumped by a pump ($P_3$) 40 so as to flow through a passage 36a provided with a specific resistance detector 34, a shutoff valve 38, the pump 40, a cooler 42, a heater 44, a manual shutoff valve 46, shutoff valves 48 and 50, and an ion exchange device (1E-1) 52 to regulate the fluid temperature and to improve the quality, such as the level of specific resistance, by improving the purity of the machining fluid. The machining fluid thus treated is returned to the first machining fluid tank 26. While the specific resistance of the machining fluid detected by the specific resistance detector 34 is maintained at a value above a fixed level, the shutoff valve 50 is held closed by applying a signal through a suitable signal line to the shutoff valve 50, and the shutoff valve 48 is opened so that the machining fluid is returned through the passage 36a directly to the filtering device 30 of the first machining fluid tank 26. The pump 40 is a pressurizing means for pumping the machining fluid under pressure through the passage 36a. The temperature of the machining fluid contained in the first machining fluid tank 26 is detected by a temperature detector 54, and either the machining fluid cooler 42 or the machining oil heater 44 is operated depending on the detected temperature of the machining fluid. The regenerated machining fluid is supplied under pressure through a passage 36b provided with a check valve 56 to the machining section of the wire cut electrical discharge machine 10 by a pump ($P_1$) 58. While the machining fluid is supplied to the machining section 14 by the rough-machining fluid supply system 20, a manual shutoff valve 59 is closed to stop the supply of machining fluid by the finish-machining fluid supply system 60.

The second machining fluid tank 66 of the finish-machining fluid supply system 60 is provided internally with a filtering device 70 having a filter element 68. The recovered machining fluid is circulated through the filtering device 70 by a pump ($P_5$) 72 similarly to circulating the recovered machining fluid through the filtering device 30 provided in the first machining fluid tank 26 of the rough-machining fluid supply system. It is a constitutional feature of this embodiment that a passage 76a provided with a specific resistance detector 74 and a shutoff valve 78 is coupled with the passage 36a of the rough-machining fluid supply system 20 after the shutoff valve 78 by the fluid couples 110 and 112. The passages 36a and 76a are coupled together by the fluid couplers 110 and 112 to enable use of the pump 40, the machining fluid cooler 42 and the machining fluid heater 44 for both the rough-machining fluid supply system 20 and the finish-machining fluid supply system 60. The finish-machining fluid is pumped by the pump 40 through the machining fluid cooler 42, the machining fluid heater 44, the manual shutoff valve 86, shutoff valves 88 and 90, and an ion exchange device (1E-2) 92 to return the finish-machining fluid to the second machining fluid tank 66 after regulating the quality thereof. While the purity, i.e., the specific resistance, of the finish-machining fluid detected by the specific resistance detector 74 is maintained at a value above a predetermined level, the shutoff valve 90 provided immediately before the ion exchange device 92 is closed to return the finish-machining fluid through the shutoff valve 88 directly into the filtering device 70 of the second machining fluid tank 66. On the other hand, the regenerated finish-machining fluid is supplied under pressure through check valves 96 and 100 and the manual shutoff valve 59 provided in a passage 76b by a pump ($P_4$) 98 to the machining section 14 of the wire cut electrical discharge machine 10. A temperature detector 94 similar to the temperature detector 54 is provided in the second machining fluid tank 66.

The machining fluid supply controlling system which regulates the quality of the machining fluid, regenerates the used machining fluid and supplies the regenerated machining fluid to the rough-machining fluid supply system 20 and the finish-machining fluid supply system 60 is constituted generally as described above. The rough-machining fluid supply system 20 has a first machining fluid quality regulating circuit for regulating the quality of the machining fluid, including the specific resistance detector 34, the machining fluid cooler 42, the machining fluid heater 44, and the ion exchange device 52, and a machining fluid supply passage provided with the pump 58, while the finish-machining fluid supply system 60 has a second machining fluid quality regulating circuit for regulating the quality of the machining fluid, including the specific resistance detector 74, the machining fluid cooler 42, the machining fluid heater 44, and the ion exchange device 92, and a machining fluid supply passage provided with the pump 98.

In accordance with the present invention, the capacity of the second machining fluid tank 66 of the finish-machining fluid supply system 60 is comparatively small compared with that of the first machining fluid tank 26, and thus the quantity of the finish-machining fluid used in the machining fluid supply controlling system is smaller than that of the rough-machining fluid used in the same. Accordingly, the rate of quality regulation of the finish-machining fluid is higher than that of the rough-machining fluid when the pumps 58 and 98 have substantially the same discharge capacity to maintain the flow rate of the machining fluid in the rough-machining fluid supply system 20 and that of the machining fluid in the finish-machining fluid supply system 60 during wire cut electrical discharge machining at substantially the same rate, because the pump 40 is used both for supplying the rough-machining fluid and for supplying the finish-machining fluid. That is, supposing that the quantity of the finish-machining fluid reserved in the second machining fluid tank 66 is one-half or one-third the quantity of the rough-machining fluid reserved in the first machining fluid tank 26, one rough-machining fluid supply cycle in which the total quantity of the rough-machining fluid reserved in the first machining fluid tank 26 is supplied to the machining section 14, returned to the first machining fluid tank 26, and subjected to the quality regulating treatment corresponds to two or three finish-machining fluid supply cycles in which the total quantity of the finish-machining fluid is supplied to the machining section 14, returned to the second machining fluid tank 66 and subjected to the quality regulating treatment two or three times. Accordingly, although the frequency of finish-machining fluid circulating cycles for circulating the finish-machining fluid through the machining section 14 is higher than that of the rough-machining fluid circulating cycles, the finish-machining fluid can be maintained at a fixed temperature and the specific resistance of the finish-machining fluid can be maintained at a fixed high level to ensure highly accurate finish machining. While the rough-machining fluid supply system 20 is operative, the shutoff valves 62, 78, 88 and 90 and the manual shutoff valves 59 and 86 are closed and the pumps 72 and 98 are stopped. While the finish-machining fluid supply system 60 is operative, the shutoff valves 22, 38, 48 and 50 and the manual shutoff valve 46 are closed and the pumps 32 and 58 are stopped.

As apparent from the foregoing description of the present invention with reference to the preferred embodiment, according to the present invention, a single wire cut electrical discharge machine is provided with a rough-machining fluid supply system and a finish-machining fluid supply system which can be changed over from one to the other according to the purpose of the machining process, and the rough-machining fluid supply system and the finish-machining fluid supply system are provided respectively with machining fluid quality regulating circuits to stabilize the temperature of the machining fluid and to maintain the specific resistance of the machining fluid on a level appropriate for the purpose of the machining process for effective quality regulation. Furthermore, the machining fluid supply controlling system of the present invention is capable of maintaining the specific resistance of the machining fluid at a high level necessary for the finish machining process to enhance the finish machining accuracy of the wire cut electrical discharge machine compared with that of the conventional wire cut electrical discharge machine.

We claim:

1. A machining fluid supply controlling system for a wire cut electrical discharge machine having a rough-machining fluid supply system and a finish-machining fluid supply system, which are connected to the machining section thereof, capable of supplying machining fluids respectively having different qualities respectively for rough machining and for finish machining, said machining fluid supply controlling system comprising:
   a first machining fluid tank having a filtering device and provided in the rough-machining fluid supply system;
   a second machining fluid tank having a filtering device and provided in the finish-machining fluid supply system;
   a first machining fluid supply passage through which a machining fluid is supplied under pressure from the first machining fluid tank to the machining section;
   a second machining fluid supply passage through which a machinig fluid is supplied under pressure from the second machining fluid tank to the machining section;
   first and second machining fluid return passages for returning the machining fluid respectively to the first and second machining fluid tanks;
   a first machining fluid quality regulating circuit for regulating the quality of the machining fluid to be supplied under pressure from the first machining fluid tank to the machining section including means for detecting the specific resistance of the first machining fluid, an ion exchange device for increasing the specific resistance of the first machining fluid and a flow control valve which opens in response to a detected specific resistance of the first machining fluid below a predetermined level to permit said first machining fluid to flow to said ion exchange device; and
   a second machining fluid quality regulating circuit for regulating the quality of the machining fluid to be supplied under pressure from the second machining fluid tank to the machining section including means for detecting the specific resistance of the second machinig fluid, a second ion exchange device for increasing the specific resistance of the second machining fluid and a second flow control valve which opens in response to a detected specific resistance of the second machining fluid below a predetermined level to permit said second machining fluid to flow to said second ion exchange device.

2. A machining fluid supply controlling system for a wire cut electrical discharge machine, according to claim 1, wherein said first and second machining fluid quality regulating circuits further include a pair of fluid couplers interconnecting the first and second machining fluid quality regulating circuits, a common passage provided with a machining fluid cooler and a machining fluid heater therein, and two manual shutoff valves to shut off one and to open the other of the first and second machining fluid quality regulating circuits.

3. A machining fluid supply controlling system for a wire cut electrical discharge machine, according to claim 2, wherein said first and second machining fluid tanks are provided respectively with temperature detectors, and the machining fluid cooler or the machining fluid heater provided in the common passage is operated depending on the temperature of the machining fluid detected by the temperature detectors.

4. A machining fluid supply controlling system for a wire cut electrical discharge machine, according to claim 1, wherein the capacity of said second machining fluid tank is smaller than that of the first machining fluid tank, and said machining fluids are supplied under substantially the same pressure to the machining section respectively through said first and second machining fluid supply passages by a pump means.

* * * * *